Dec. 23, 1958 F. D. BIGGAM 2,866,104
FREQUENCY DIVIDER CIRCUIT
Filed Dec. 8, 1955
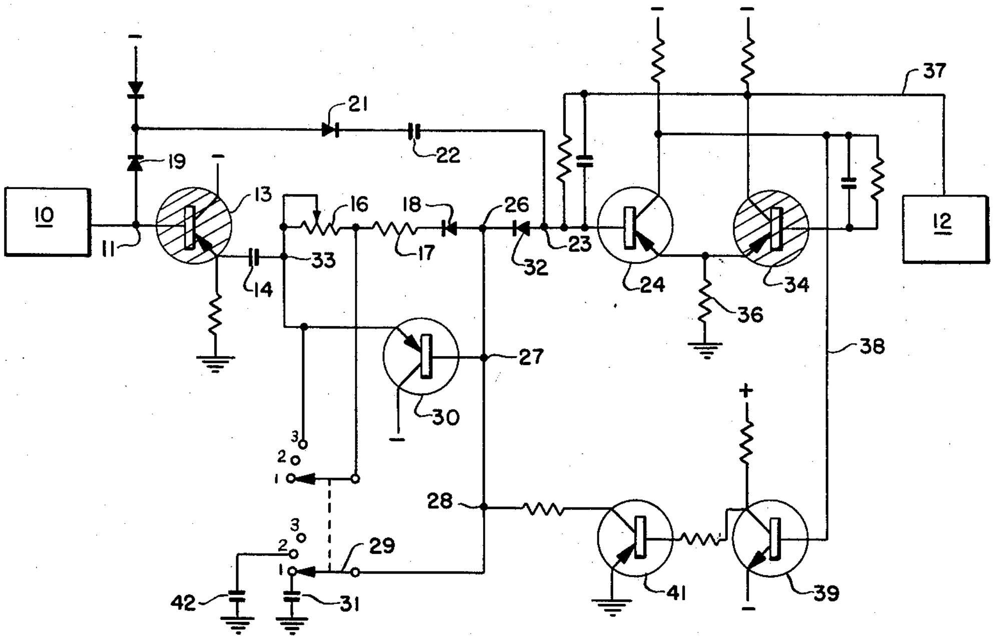
FIG. I
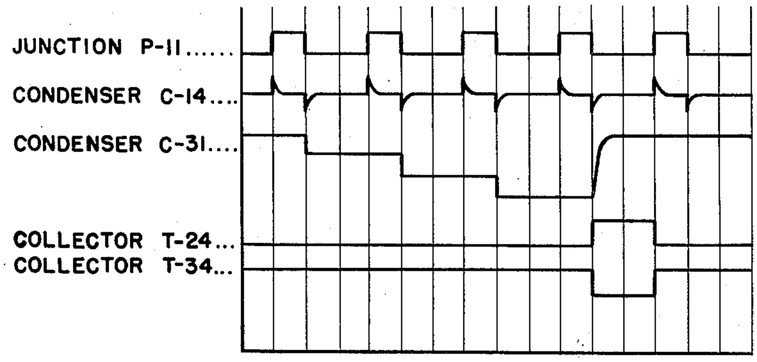
FIG. 2
INVENTOR
FRANK D. BIGGAM
BY Emery Robinson
ATTORNEY 2,866,104

FREQUENCY DIVIDER CIRCUIT

Frank D. Biggam, Chicago, Ill., assignor to Teletype Corporation, Chicago, Ill., a corporation of Delaware Application December 8, 1955, Serial No. 551,820

6 Claims. (Cl. 307—88.5)

This invention relates to frequency divider circuits and more particularly to a transistor controlled circuit for receiving a predetermined number of input pulses and producing a single output pulse.

In numerous electronic installations, circuits and mechanisms are controlled by frequency dividers adapted to receive and count a predetermined number of input pulses, and produce one or more output pulses. In general these frequency dividers have been characterized by a number of tandemly connected electronic stages wherein the reception of successive input pulses steps the operative stage until an output stage is operated. Obviously with such an arrangement a great number of control elements are required resulting in high cost, large space requirements, and frequent maintenance problems. As an alternate expedient, attempts have been made to charge a condenser with a plurality of input pulses to progressively raise the charged condition on the condenser to such an extent as to operate an output pulse producing device. When high divisions are required these condenser control devices are limited in sensitivity in that the condenser charges in an exponential fashion, hence the culmination of the required charge is very unpredictable due to the minute build up of the charges occurring after the first few initial charges have been applied to the condenser. Another inherent disadvantage present in many condenser controlled frequency divider circuits resides in the use of electronic tubes that generate heat causing closely positioned condensers to vary in function characteristics after relatively short periods of operation.

It is a primary object of the present invention to provide a simple and inexpensive transistor controlled frequency divider employing a condenser that is charged in steps of equal magnitude.

An additional object of the invention is to provide a frequency divider having elements that may be closely packaged without any danger of changing operational characteristics due to heat.

Another object of the invention is to provide a transistor frequency divider having a condenser that is progressively charged to eventually operate an output pulse producing device together with facilities for discharging the condenser during generation of the output pulse.

A further object of the invention is the provision of a frequency divider having an output binary that is operated after receipt of a predetermined number of input pulses and which is restored to an initial state upon receipt of another input pulse.

With these and other objects in view the present invention contemplates a pulsing means for applying pulses to be divided to a normally operating transistor. Receipt of each pulse causes a decrease and then an increase in the conductivity of the transistor which effectuates, through a differentiating condenser, the generation of a series of negative pulses that are stored on a condenser. A second normally conducting transistor interconnects the differentiating condenser and the storage condenser to apply a conditioning potential to the differentiating condenser. As the termination of each subsequent pulse increases the conductivity of the first transistor to impress negative charges through the differentiating condenser, these negative charges are re-enforced to apply charges of equal magnitude on the storage condenser. Eventually the charge built up on the storage condenser is sufficient to operate an output binary circuit to produce the forward potential transition of an output pulse. A by-pass circuit is provided for receiving the next input pulse and applying it to the binary circuit to restore this circuit following its operation, thereby effecting the generation of the rear potential transition of the output pulse. Facilities are also provided to selectively change the output frequency.

Other objects and advantages of the present invention will be apparent from the following detailed description when considered in conjunction with the accompanying drawing wherein:

Fig. 1 is a circuit diagram of a frequency divider embodying the principal features of the invention; and Fig. 2 is a potential characteristic diagram illustrating the potential conditions existing on various elements during a cycle of operation of the frequency divider shown in Fig. 1.

Referring to Fig. 1 there is shown a suitable source of keying waves designated by the reference numeral 10. This keyer 10 is adapted to supply rectangular positive going wave pulses to a junction point 11 (see also P–11 in Fig. 2). The frequency of the pulses applied to the junction point is high in comparison to the output waves to be derived from the circuit and supplied to an output utilization device 12.

The increase in potential on junction point 11 is impressed on the base of a normally conducting emitter follower transistor 13. Transistor 13 as well as the other transistors shown in Fig. 1 are of the junction type described in the patent to Shockley No. 2,569,347, issued September 25, 1951. More particularly, transistor 13 is a PNP type junction transistor and is normally in a conductive state, consequently the appearance of an increased potential on its base reduces its conductivity. Reduction in conductivity of transistor 13 is accompanied by a rise in its emitter potential which is impressed through a differentiating condenser 14 to produce a positive going voltage spike that is impressed through a high resistance 16 and a low resistance 17 to a diode 18 biased to preclude the passage therethrough of positive pulses. This pulse therefore has no effect on the operation of the circuit.

The increase in potential on junction point 11 is also impressed through a diode 19 and a diode 21 to a differentiating condenser 22. Condenser 22 reacts to the increased potential applied thereto by producing a positive going pulse which is impressed through a junction point 23 to the base of a normally nonconducting PNP type junction transistor 24. Inasmuch as this transistor 24 is not in a conductive state the appearance of a positive going potential on its base does not alter its conductivity.

When the negative going transition of the input pulse is applied to the junction point 11, the base of transistor 13 is driven negative with respect to its emitter to drive this transistor into a heavy state of conduction. This action is accompanied by a drop in the potential on the emitter which drop is impressed through the differentiating condenser 14 to produce a negative going pulse (see also C–14 in Fig. 2). The negative going pulse is impressed through resistances 16 and 17 to drive the diode 18 into an instantaneous state of conduction and thus reduce the potential at a junction point 26. This instantaneous drop in potential is further impressed through junction points 27 and 28 and through a switch 29 to effectuate a charging of a storage condenser 31. The drop in potential at junction point 26 is not of sufficient amplitude to effectuate a reversal of the bias on diode 32, which is biased to prevent the passage of pulses below a minimum negative amplitude. Since diode 32 therefore offers a high resistance to the passage of the first pulses received, no energy is transmitted to the base of transistor 24 and it remains in a nonconductive state. The negative charge established on the upper plate of the condenser 31 is reflected on the base of an emitter follower transistor 30 therefore increasing the conductivity of this transistor. This results in a drop in potential on the emitter of transistor 30 which effectuates a drop in the potential impressed on a junction point 33.

As the negative going transitions of the next and subsequent pulses cause the transistor 13 to be driven into heavy states of conduction the negative pulses applied by the differentiating condenser 14 are re-enforced by the negative potential condition existing at the junction point 33. Due to this re-enforcement action the energy lost by the pulses passing through resistances 16 and 17 does not affect the charging ability of these pulses on the condenser 31 and as a result thereof the condenser is successively charged in steps of even magnitude (see also C–31 in Fig. 2). As each charge is built up on the condenser 31 the transistor 30 is driven into successively greater states of conductivity and its emitter potential drops to apply a decreased conditioning potential to the junction point 33 to re-enforce each subsequent negative voltage spike produced by the action of the differentiating condenser 14.

After receipt of a predetermined number of pulses the charge on condenser 31 is built up sufficiently until a threshold point is reached on the bias of diode 32 wherein the next negative pulse received is sufficient to drive diode 32 into its low resistance region and to transmit sufficient energy to the base of transistor 24 to drive it into conduction. Transistor 24 together with a PNP type transistor 34 form a binary circuit having an A. C.–D. C. parallel coupling running from the collector of each transistor to the base of the other transistor. The emitter of each of these transistors 24 and 34 is connected through a resistance to ground and the collectors thereof are connected to suitable sources of negative potential. When the transistor 24 becomes conductive its collector potential immediately rises and this rise is impressed through the accelerating A. C. coupling running to the base of the transistor 34, therefore, driving the base positive with respect to the emitter and effectuating a shutting off of the transistor 34. With the transistor 34 shut off an immediate drop in collector potential is noted which is impressed over an output lead 37 to the utilization device 12.

The rise in collector potential of transistor 24 is also impressed over a lead 38 to the base of a normally nonconducting NPN type transistor 39. Transistor 39 normally has positive potential applied to its collector which is also impressed on the base of a normally conducting PNP type transistor 41, thus holding this transistor from conduction. However, the appearance of a positive pulse on the lead 38 drives the transistor 39 into a heavy state of conduction and as a result thereof its collector potential instantly drops to apply a decrease in potential on the base of the transistor 41. Transistor 41 is immediately placed in a conductive state and completes a discharge circuit for the condenser 31 which may be traced from the condenser 31 through the switch 29, through the junction point 28 and through the now conducting transistor 41 to ground.

When the positive transition accompanying the next succeeding pulse from the source 10 is applied to the junction point 11 the increased potential is impressed through the diodes 19 and 21 and through the condenser 22 wherein a differentiated positive going pulse is produced. This positive going pulse is impressed through the junction point 23 to the base of the transistor 24 causing the transistor 24 to be again rendered nonconducting. Obviously upon transistor 24 assuming a nonconductive state its collector potential drops to impress a decreased potential on the base of the transistor 34. Transistor 34 thereupon becomes conducting and its collector potential rises to impress an increased potential condition on the lead 37 running to the utilization device 12. This action effectuates the termination of the output pulse.

Looking at Fig. 2 the output pulse is shown in the wave form designated T–34 and it will be noted that it is in a negative direction which is just the inverse of the pulses applied to the junction point 11. In order to obtain positive going pulses it would be only necessary to connect the output lead 37 to the collector of the transistor 24. This condition is illustrated in Fig. 2 by the wave form designated T–24. The build up of charge on condenser 31 is depicted in Fig. 2 by the wave form designated C–31 and it will be noted that the charge builds up in substantially even increments until such time as the discharge circuit through transistor 41 is completed. The discharge occurs in an exponential manner and is completed during the time that the output pulse is impressed on the lead 37.

The number of input pulses from the source 10 necessary to operate the binary 24–34 may be changed by moving the switch 29 to the number 2 contact to connect another condenser 42 in place of the condenser 31. If condenser 42 has a lower capacitance value, then it will take less charges to build up the necessary potential to effectuate the operation of the output binary. On the other hand, if the capacitance value of condenser 42 is greater than that of condenser 31, then it will require more input pulses to produce the necessary charge to effectuate the operation of the output binary 34.

When switch 29 is moved to its number 3 contact position, a shunt is connected across the resistance 16; consequently there is very little energy lost by the pulse produced by the differentiating condenser 14. In fact this increased pulse will be of sufficient magnitude to pass through the diodes 18 and 32 to the base of the transistor 24, culminating in an immediate operation of this transistor. In this instance the transistor 24 will again be rendered nonconducting by the impression of a positive going pulse over the by-pass circuit including the diodes 19 and 21. There will be no division of frequency accomplished by this particular circuit arrangement and each input pulse will effectuate the generation of an output pulse.

It is to be understood that other types of transistors may be used besides those shown. By merely making suitable obvious changes in operating potentials in the modifiied circuit, the desirable results of the invention may be obtained. In addition, other changes may be made in the circuit components and elements without departing from the principles of the invention.

What is claimed is:

1. In a frequency divider, a normally conductive emitter follower transistor, a differentiating condenser, a storage condenser, means for applying pulses to said transistor to cause said differentiating condenser to produce charging pulses, means responsive to the charging pulses of one polarity from said pulse-producing means for charging said storage condenser, means connecting said storage condenser and said differentiating condenser for applying a potential condition indicative of the charge on the storage condenser to said differentiating condenser, and an output device activated by a predetermined charge on the storage condenser.

2. A frequency divider comprising a transistor, a source of input pulses having a first frequency for driving said transistor into states of conduction and nonconduction, a differentiating condenser connected to said transistor for producing charging pulses in response to said transistor being rendered conductive, a storage condenser charged by said charging pulses, means for applying a potential indicative of said charged condition of said storage condenser to said differentiating condenser to re-enforce the subsequent charging pulses, and a binary output device actuated by a predetermined charge on said storage condenser for producing pulses at a second frequency.

3. A frequency divider circuit including a normally conductive transistor, means for alternately rendering the transistor nonconductive and conductive, means responsive to the changing conductive state of the transistor for producing charging pulses, a storage condenser, means responsive to charging pulses of a predetermined polarity for applying said pulses to charge the storage condenser, means for applying a re-enforcing potential indicative of said charged storage condenser to said charging pulse producing means, an output device actuated by a predetermined number of charges being impressed on said storage condenser, and a variable resistance in said pulse-producing means for determining the magnitude of the charges impressed on said storage condenser.

4. In a frequency divider, a normally conductive transistor, a differentiating condenser connected to said transistor, means for applying pulses to render said transistor conductive and nonconductive whereby the differentiating condenser produces negative pulses, a storage condenser, means responsive to said negative pulses to successively charge the storage condenser, an emitter follower transistor circuit interconnecting the storage condenser with the differentiating condenser to apply a re-enforcing potential condition to each subsequent negative pulse, an output device, and a diode-controlled circuit actuated by a predetermined charge on the storage condenser for operating the output device.

5. A frequency divider comprising a transistor normally biased into a conductive state, input pulsing means for alternately rendering said transistor nonconductive and conductive, a differentiating condenser for producing charging pulses in response to the transistor being rendered conductive, a storage condenser charged in accordance with said charging pulses, a transistor means interconnecting said storage condenser and differentiating condenser for applying a conditioning potential to said differentiating condenser that is proportional to the charge on the storage condenser, an output circuit adapted to be actuated in two stable states, an isolating diode rendered conductive by a predetermined charge on the storage condenser to operate said output device into a first stable state, and a by-pass circuit for applying an input pulse to said output device to operate said output device into a second stable state.

6. In a frequency divider circuit, a first normally-conducting emitter follower transistor having a base, a collector and an emitter, a differentiating condenser connected to said emitter, a resistance and a diode connected in series to said differentiating condenser, said diode being biased to preclude passage of positive pulses therethrough, an output circuit having a normally-operating stage and a normally-nonoperating stage connected to said diode, a second normally-conducting emitter follower transmitter having a base, emitter and collector, means for connecting the emitter and the base of the second transistor in parallel across said serially connected diode and resistance, a storage condenser connected to the base of the second transistor, a by-pass circuit connected between the base of the first transistor and the normally-nonoperating stage of the output circuit, and means for applying positive going pulses to the base of the first transistor whereby the trailing transitions of the pulses increase the conductivity of the first transistor to cause the differentiating condenser to produce negative going pulses which successively charge the storage condenser to ultimately operate the normally-nonoperating stage of the output circuit, said output circuit being restored to its initial condition by the positive going transition of the next succeeding pulse passing over the by-pass circuit.

References Cited in the file of this patent

UNITED STATES PATENTS

| | | |
|---|---|---|
| 2,518,499 | Smith | Aug. 15, 1950 |
| 2,573,150 | Lacy | Oct. 30, 1951 |
| 2,584,990 | Dimond | Feb. 12, 1952 |
| 2,620,448 | Wallace | Dec. 2, 1952 |